US012355618B2

United States Patent
Ouellette et al.

(10) Patent No.: US 12,355,618 B2
(45) Date of Patent: Jul. 8, 2025

(54) SYSTEMS AND METHODS FOR DYNAMIC DEVICE CONFIGURATION USING MACHINE-READABLE OPTICAL LABELS

(71) Applicant: Tyco Fire & Security GmbH, Neuhausen am Rheinfall (CH)

(72) Inventors: Jason M. Ouellette, Leominster, MA (US); James Lee Bauerle, Jr., Carmel, IN (US); Khaled Saad, La Prairie (CA); Gopal Paripally, North Andover, MA (US); Jammy Desousa, Lowell, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 91 days.

(21) Appl. No.: 18/103,854

(22) Filed: Jan. 31, 2023

(65) Prior Publication Data
US 2024/0259259 A1    Aug. 1, 2024

(51) Int. Cl.
*H04L 41/0806*  (2022.01)
*H04L 41/0273*  (2022.01)
*H04L 61/5014*  (2022.01)

(52) U.S. Cl.
CPC ...... *H04L 41/0806* (2013.01); *H04L 41/0293* (2013.01); *H04L 61/5014* (2022.05)

(58) Field of Classification Search
None
See application file for complete search history.

(56) References Cited

U.S. PATENT DOCUMENTS

| 8,302,848 | B2 | 11/2012 | Koch et al. | |
|---|---|---|---|---|
| 2013/0169996 | A1 | 6/2013 | McLeod et al. | |
| 2013/0200142 | A1* | 8/2013 | Larson | G06F 16/27 235/375 |
| 2016/0171359 | A1* | 6/2016 | Niedereder | G05B 19/0428 235/494 |
| 2017/0234844 | A1* | 8/2017 | Martin | G01F 25/15 702/116 |
| 2020/0007676 | A1* | 1/2020 | Pai | H04W 8/18 |
| 2021/0396417 | A1 | 12/2021 | Ratakonda et al. | |
| 2022/0113986 | A1 | 4/2022 | Schnacker | |

* cited by examiner

*Primary Examiner* — Younes Naji
(74) *Attorney, Agent, or Firm* — ArentFox Schiff LLP

(57) ABSTRACT

Example implementations include a method, apparatus and computer-readable medium for generating deployment capabilities of a device, comprising generating a machine-readable optical label that is specific to the device during manufacturing, wherein the device is a new device that is to be added to a network comprising a plurality of devices. The implementations further include configuring a firmware of the device to create a web server that provides a webpage, wherein the webpage includes a user interface that receives and provides configuration information. Additionally, the implementations further include linking the machine-readable optical label to the webpage such that when the machine-readable optical label is scanned by a different device, the webpage is generated on the different device.

12 Claims, 6 Drawing Sheets

SYSTEMS AND METHODS FOR DYNAMIC DEVICE CONFIGURATION USING MACHINE-READABLE OPTICAL LABELS

TECHNICAL FIELD

The described aspects relate to device networking systems.

BACKGROUND

Aspects of the present disclosure relate generally to device networking systems, and more particularly, to systems and methods for dynamic device configuration using machine-readable optical labels.

When a new device is to be added to an existing network of devices, there is an onboarding process that configures the new device to behave as desired by an administrator or user of the network. This onboarding process may be cumbersome due to various reasons. For example, there may be connectivity issues with the new device, the new device may be compromised by a malicious entity, access to the configuration information of the new device may be linked to an Internet-based server that cannot be reached, etc.

Conventional device networking systems are unable to address these onboarding issues. Accordingly, there exists a need for improvements in such device networking systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for generating deployment capabilities of a device, comprising generating a machine-readable optical label that is specific to the device during manufacturing, wherein the device is a new device that is to be added to a network comprising a plurality of devices. The method further includes configuring a firmware of the device to create a web server that provides a webpage, wherein the webpage includes a user interface that receives and provides configuration information. Additionally, the method further includes linking the machine-readable optical label to the webpage such that when the machine-readable optical label is scanned by a different device, the webpage is generated on the different device.

Another example aspect includes an apparatus for generating deployment capabilities of a device, comprising a memory and a processor coupled with the memory. The processor is configured to generate a machine-readable optical label that is specific to the device during manufacturing, wherein the device is a new device that is to be added to a network comprising a plurality of devices. The processor is further configured to configure a firmware of the device to create a web server that provides a webpage, wherein the webpage includes a user interface that receives and provides configuration information. Additionally, the processor further configured to link the machine-readable optical label to the webpage such that when the machine-readable optical label is scanned by a different device, the webpage is generated on the different device.

Another example aspect includes an apparatus for generating deployment capabilities of a device, comprising means for generating a machine-readable optical label that is specific to the device during manufacturing, wherein the device is a new device that is to be added to a network comprising a plurality of devices. The apparatus further includes means for configuring a firmware of the device to create a web server that provides a webpage, wherein the webpage includes a user interface that receives and provides configuration information. Additionally, the apparatus further includes means for linking the machine-readable optical label to the webpage such that when the machine-readable optical label is scanned by a different device, the webpage is generated on the different device.

Another example aspect includes a computer-readable medium having instructions stored thereon for generating deployment capabilities of a device, wherein the instructions are executable by a processor to generate a machine-readable optical label that is specific to the device during manufacturing, wherein the device is a new device that is to be added to a network comprising a plurality of devices. The instructions are further executable to configure a firmware of the device to create a web server that provides a webpage, wherein the webpage includes a user interface that receives and provides configuration information. Additionally, the instructions are further executable to link the machine-readable optical label to the webpage such that when the machine-readable optical label is scanned by a different device, the webpage is generated on the different device.

An example aspect includes a method for configuring a device, comprising scanning, by a computing device, a machine-readable optical label of a new device that is to be added to a network comprising a plurality of devices, wherein the machine-readable optical label is unique to the new device. The method further includes establishing a connection with the new device in response to scanning the machine-readable optical label. Additionally, the method further includes receiving, from the new device, a webpage that includes a user interface that receives and provides configuration information. Additionally, the method further includes exchanging the configuration information with the new device, wherein the exchange configures the new device for addition into the network.

Another example aspect includes an apparatus for configuring a device, comprising a memory and a processor coupled with the memory. The processor is configured to scan, by a computing device, a machine-readable optical label of a new device that is to be added to a network comprising a plurality of devices, wherein the machine-readable optical label is unique to the new device. The processor is further configured to establish a connection with the new device in response to scanning the machine-readable optical label. Additionally, the processor further configured to receive, from the new device, a webpage that includes a user interface that receives and provides configuration information. Additionally, the processor further configured to exchange the configuration information with the new device, wherein the exchange configures the new device for addition into the network.

Another example aspect includes an apparatus for configuring a device, comprising means for scanning, by a computing device, a machine-readable optical label of a new device that is to be added to a network comprising a plurality of devices, wherein the machine-readable optical label is unique to the new device. The apparatus further includes means for establishing a connection with the new device in response to scanning the machine-readable optical label.

Additionally, the apparatus further includes means for receiving, from the new device, a webpage that includes a user interface that receives and provides configuration information. Additionally, the apparatus further includes means for exchanging the configuration information with the new device, wherein the exchange configures the new device for addition into the network.

Another example aspect includes a computer-readable medium having instructions stored thereon for configuring a device, wherein the instructions are executable by a processor to scan, by a computing device, a machine-readable optical label of a new device that is to be added to a network comprising a plurality of devices, wherein the machine-readable optical label is unique to the new device. The instructions are further executable to establish a connection with the new device in response to scanning the machine-readable optical label. Additionally, the instructions are further executable to receive, from the new device, a webpage that includes a user interface that receives and provides configuration information. Additionally, the instructions are further executable to exchange the configuration information with the new device, wherein the exchange configures the new device for addition into the network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods that provide dynamic device configuration using machine-readable optical labels, such as but not limited to a barcode and/or a quick response (QR) code. When a new device is to be added to a network of devices, a unique machine-readable optical label specific to the device is scanned. This machine-readable optical label points to a webpage that is on the new device (rather than on an Internet-based server). The user can provide configuration information to the new device via the webpage and complete an onboarding process that adds the new device to the network of devices.

Figure 1:
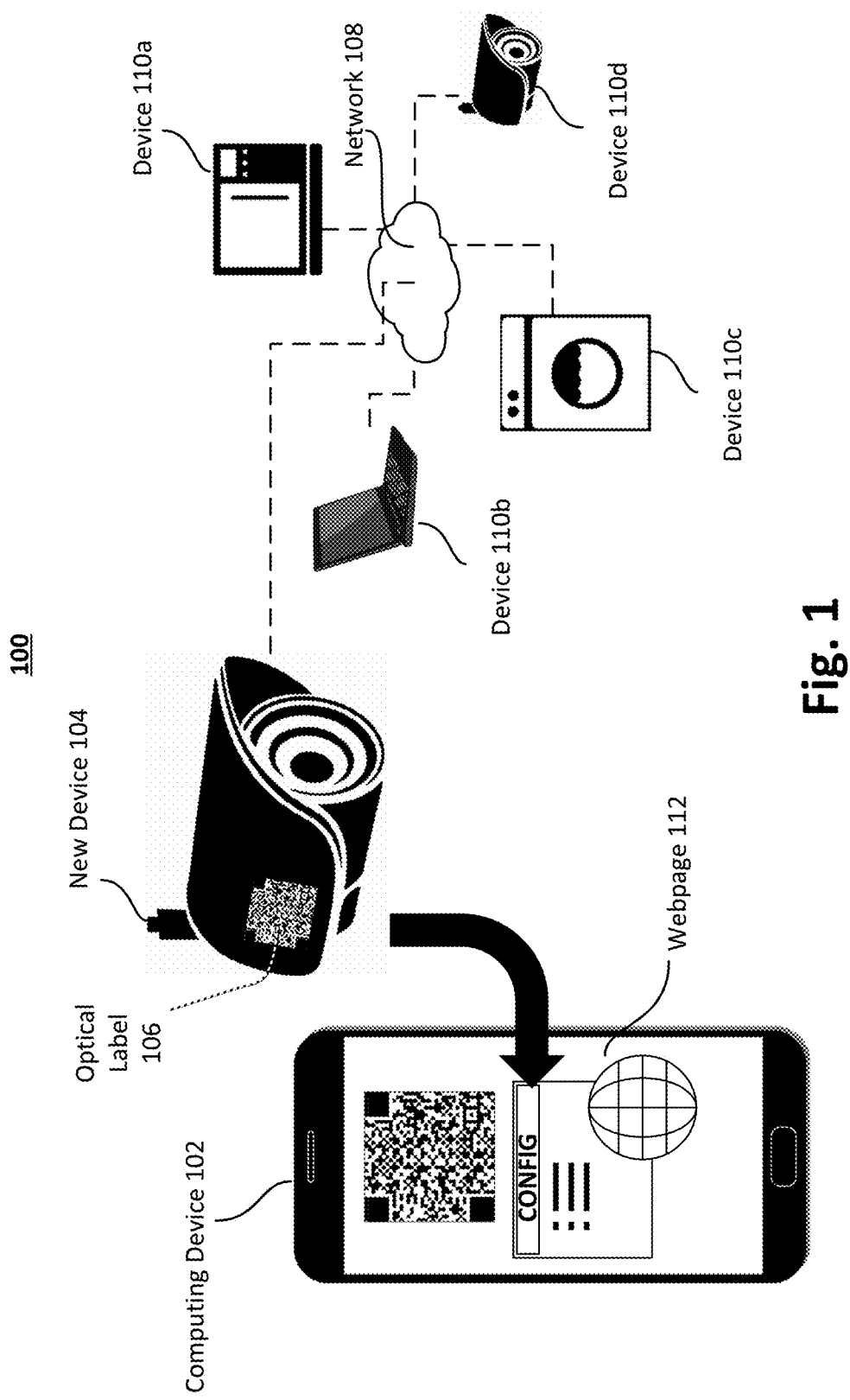
FIG. 1 is a diagram for deploying a new device using a machine-readable optical label, in accordance with exemplary aspects of the present disclosure.

FIG. 1 is a diagram 100 for deploying a new device using a machine-readable optical label, in accordance with exemplary aspects of the present disclosure. Diagram 100 includes network 108, which may include any number of devices. For simplicity, only four devices are shown, namely, device 110a, device 110b, device 110c, and device 110d. In some aspects, each of the devices may be of the same device type. For example, all of the devices may be cameras in a surveillance system. In other aspects, the devices may be a combination of different devices. For example, in FIG. 1, device 110a is a smart microwave, device 110b is a laptop, device 110c is a smart washing machine, and device 110d is a camera. Network 108 may be a local area network or a wide area network (e.g., the Internet). A user or administrator of network 108 may configure devices 110 to communicate with one another to perform various tasks. For example, device 110c may be configured to activate a washing action when device 110b detects a person in a video stream generated by device 110d.

A user or administrator may be interested in adding new device 104 to network 108. In a scenario where device 104 does not produce its own user interface that allows for onboarding, computing device 102 may be used to facilitate the configuration of new device 104. For example, computing device 102 may be a smartphone with a camera that can recognize machine-readable optical label 106 configured to point to webpage 112 that includes a user interface for obtaining configuration information for the new device 104. In some aspects, machine-readable optical label 106 is a QR code. In some aspects, webpage 112 is a static configuration uniform resource locator (URL) page. Webpage 112 may have dropdown menus to choose from different options. For example, a user may choose between Static IP address or DHCP, select a time zone, a country, a metric system, etc.

In a conventional setting, a webpage pointed to by a conventional machine-readable optical label exists on an Internet-based server that computing device 102 connects to via the Internet. This connection, however, is unreliable in terms of security and connectivity. For example, if the Internet-based server is not functioning or new device 104 is behind a firewall, new device 104 cannot be set up because computing device 102 cannot reach the Internet-based server.

In another example, a malicious entity may compromise the connection between the Internet-based server and computing device 102, and begin intercepting the information exchanged between the two parties. More specifically, a device that is to be configured may be associated with a private encryption key and a public encryption key. In order to receive the public encryption key of the device, an Internet-based server needs to establish a handshake with the device and then create an encrypted tunnel. Until the encrypted tunnel is setup, any communication with the Internet-based server is vulnerable. In fact, even the exchange of encryption keys can be problematic if a malicious entity is anticipating an exchange and plans to intercept.

Moreover, conventional machine-readable optical labels that point to an Internet-based server are conventionally not specific to a new device. At best, the machine-readable optical label matches other machine-readable optical labels of the same device type. For example, cameras of a specific model may all be shipped with the same machine-readable optical label.

In the present disclosure, machine-readable optical label 106 is specific to new device 104. For instance, during the manufacturing/configuration stage of new device 104, a unique machine-readable optical label 106 is generated for new device 104. In some aspects, machine-readable optical label 106 is based on a MAC address of new device 104, ensuring the individuality of the code because MAC addresses are globally unique for all devices. The unique MAC address may be converted into a barcode or QR code that links to device-specific configuration information stored on new device 104. New device 104 may have its own local web server, and is further configured by a device configuration component such that the firmware of new device 104 transmits webpage 112 to a facilitating device such as computing device 102. Via webpage 112, computing device 102 and new device 104 may interact. For example, webpage 112 may include device-specific configuration information that is transmitted from new device 104 to computing device 102 and may also include a user interface through which computing device 102 can provide configuration information. Machine-readable optical label 106 specifically points to webpage 112, which enables settings that will be written to both the host of network 108 and on new device 104 to set the device configuration. In some aspects, configuration information may include Static Internet Protocol (IP) or Dynamic Host Configuration Protocol (DHCP) IP address, host parameters, MAC addresses, user preferences, security parameters, etc. This approach circumvents the need for an Internet-based server connection, making the approach convenient and secure because all actions are performed in the edge layer. By scanning machine-readable optical label 106 and enabling dynamic configuration, new device 104 can be rapidly deployed. When dealing with the deployment of several new devices for network 108, the method of the present disclosure results in shorter installation times, increased profits, and less chance for human error.

In some aspects, subsequent to configuring new device 104, webpage 112 enters a dormant mode. If a user attempts to scan machine-readable optical label 106 again, webpage 112 may generate an indication that new device 104 has been configured already and requires a factory reset to reconfigure. When new device 104 is factory reset, machine-readable optical label 106 may be rescanned using computing device 102 to apply new configurations via webpage 112, which enters an active mode.

Entering/exiting active mode and entering/exiting dormant mode may involve setting an indicator internally in new device 104. When new device 104 first ships from the manufacturer, the default state is active mode. When configuration of new device 104 is complete at the edge layer, new device 104 may toggle the indicator to trigger dormant mode. When new device 104 undergoes a factory reset, new device may toggle the indicator again to trigger active mode.

In some aspects, despite not needing a connection to an Internet-based server, subsequent to the configuration of new device 104, a connection between new device 104 and an Internet-based server may be established (e.g., to push configuration settings).

Figure 2:
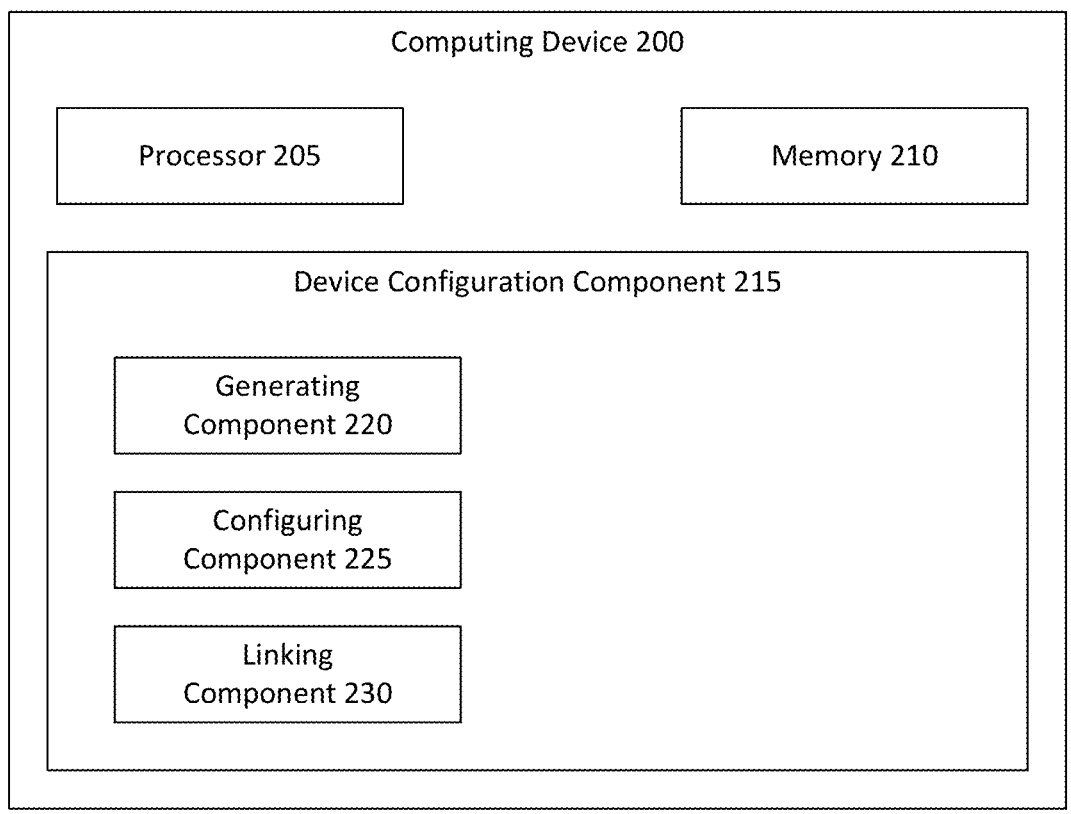
FIG. 2 is a block diagram of an example of a computer device having components configured to perform a method for generating deployment capabilities of a device.
Figure 3:
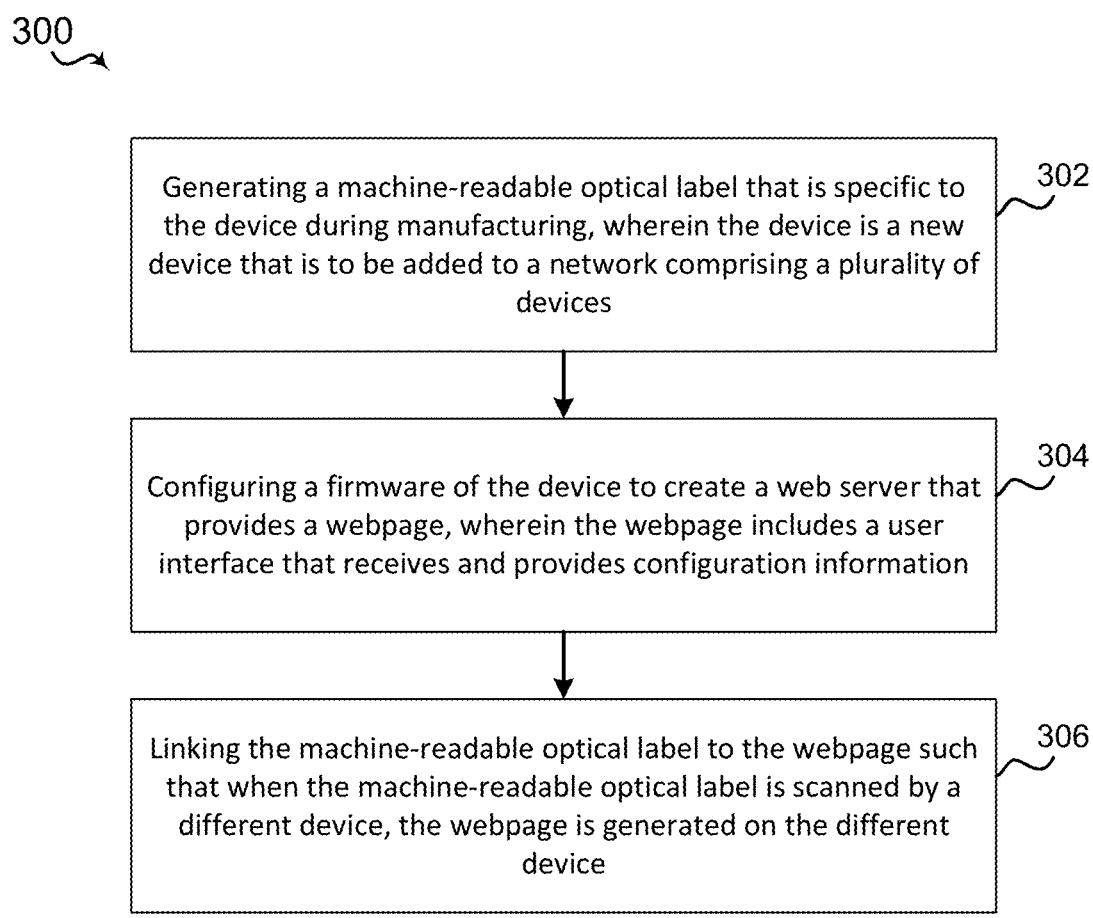
FIG. 3 is a flowchart of an example of a method for generating deployment capabilities of a device.

Referring to FIG. 2 and FIG. 3, in operation, computing device 200 may perform a method 300 for generating deployment capabilities of a device via execution of device configuration component 215 by processor 205 and/or memory 210.

At block 302, the method 300 includes generating a machine-readable optical label that is specific to the device during manufacturing, wherein the device is a new device that is to be added to a network comprising a plurality of devices. For example, in an aspect, computing device 200, processor 205, memory 210, device configuration component 215, and/or generating component 220 may be configured to or may comprise means for generating a machine-readable optical label 106 (e.g., a QR code) that is specific to new device 104 during manufacturing, wherein new device 104 is to be added to network 108 comprising a plurality of devices (e.g., device 110a, device 110b, device 110c, and device 110d).

For example, generating component 220 may be a random optical label generator. To ensure that a machine-readable optical label does not already exist, generating component 220 may compare each new optical label against a database of previously generated optical labels. In an alternative or additional aspect, machine-readable optical label 106 is based on a unique address identifier of new device 104. For example, the unique address identifier may be a MAC address of new device 104 and optical label 106 may be a visualization of the MAC address.

At block 304, the method 300 includes configuring a firmware of the device to create a web server that provides a webpage, wherein the webpage includes a user interface that receives and provides configuration information. For example, in an aspect, computing device 200, processor 205, memory 210, device configuration component 215, and/or configuring component 225 may be configured to or may comprise means for configuring a firmware of new device 104 to create a web server that provides webpage 112, wherein webpage 112 includes a user interface that receives and provides configuration information (e.g., during deployment).

In an alternative or additional aspect, the configuration information includes one or more of: a Static IP address, a DHCP IP address, a host parameter, a MAC address, user preference information, or a security parameter.

At block 306, the method 300 includes linking the machine-readable optical label to the webpage such that when the machine-readable optical label is scanned by a different device, the webpage is generated on the different device. For example, in an aspect, computing device 200, processor 205, memory 210, device configuration component 215, and/or linking component 230 may be configured to or may comprise means for linking machine-readable optical label 106 to webpage 112 such that when machine-readable optical label 106 is scanned by computing device 102 (more specifically a camera of computing device 102), the webpage is generated on computing device 102 (e.g., on a web-browsing application).

Figure 4:
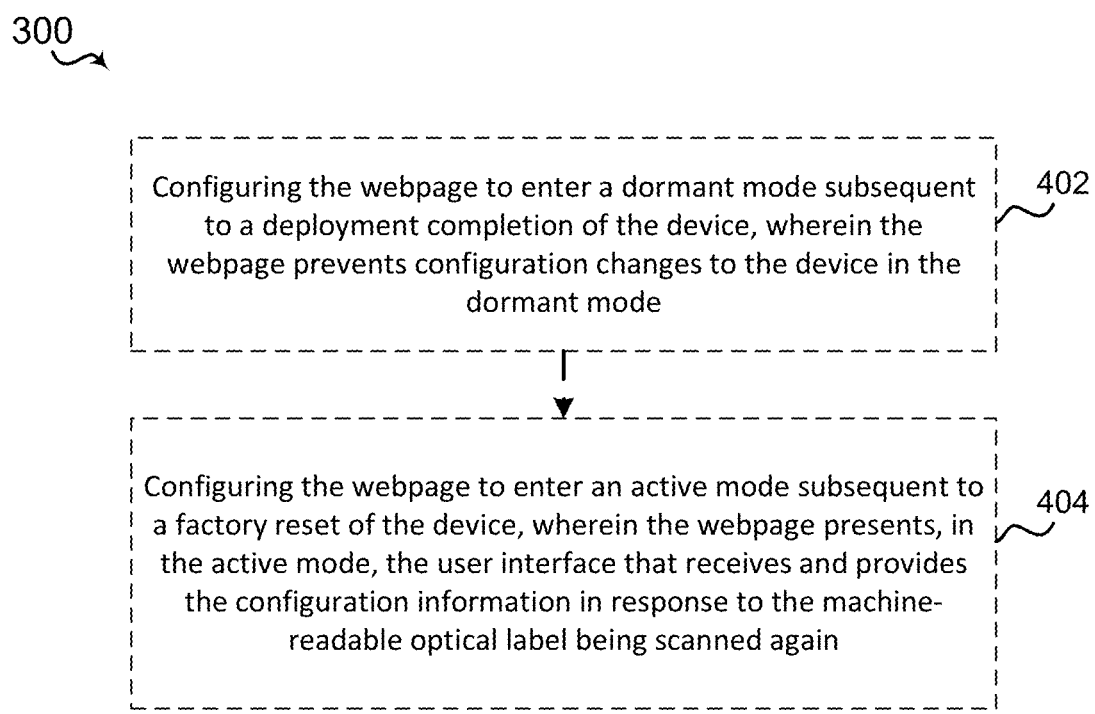
FIG. 4 is a flowchart of additional aspects of the method of FIG. 3.

Referring to FIG. 4, in an alternative or additional aspect, at block 402, the method 300 may further include configuring the webpage to enter a dormant mode subsequent to a deployment completion of the device, wherein the webpage prevents configuration changes to the device in the dormant mode. For example, in an aspect, computing device 200, processor 205, memory 210, device configuration component 215, and/or configuring component 225 may be configured to or may comprise means for configuring webpage 112 to enter a dormant mode subsequent to a deployment completion of device 104, wherein webpage 112 prevents configuration changes to the device in the dormant mode. In some aspects, to exit dormant mode, new device 104 needs to be factory reset.

In this optional aspect, at block 404, the method 300 may further include configuring the webpage to enter an active mode subsequent to a factory reset of the device, wherein the webpage presents, in the active mode, the user interface that receives and provides the configuration information in response to the machine-readable optical label being scanned again. For example, in an aspect, computing device 200, processor 205, memory 210, device configuration component 215, and/or configuring component 225 may be configured to or may comprise means for configuring webpage 112 to enter an active mode subsequent to a factory reset of new device 104, wherein webpage 112 presents, in the active mode, the user interface that receives and provides the configuration information in response to machine-readable optical label 106 being scanned again.

Dormant mode prevents new device 104 from being reconfigured by a malicious entity. For example, a malicious entity would be unable to install a rootkit on new device 104 that specifically changes the configuration information of new device 104. Because a factory reset is required to exit dormant mode, the factory reset would remove any rootkits or malware on new device 104. In some aspects, information about optical label 106 and webpage 112 is stored in a memory portion of new device 104 that is not deleted when a factory reset is performed.

Figure 5:
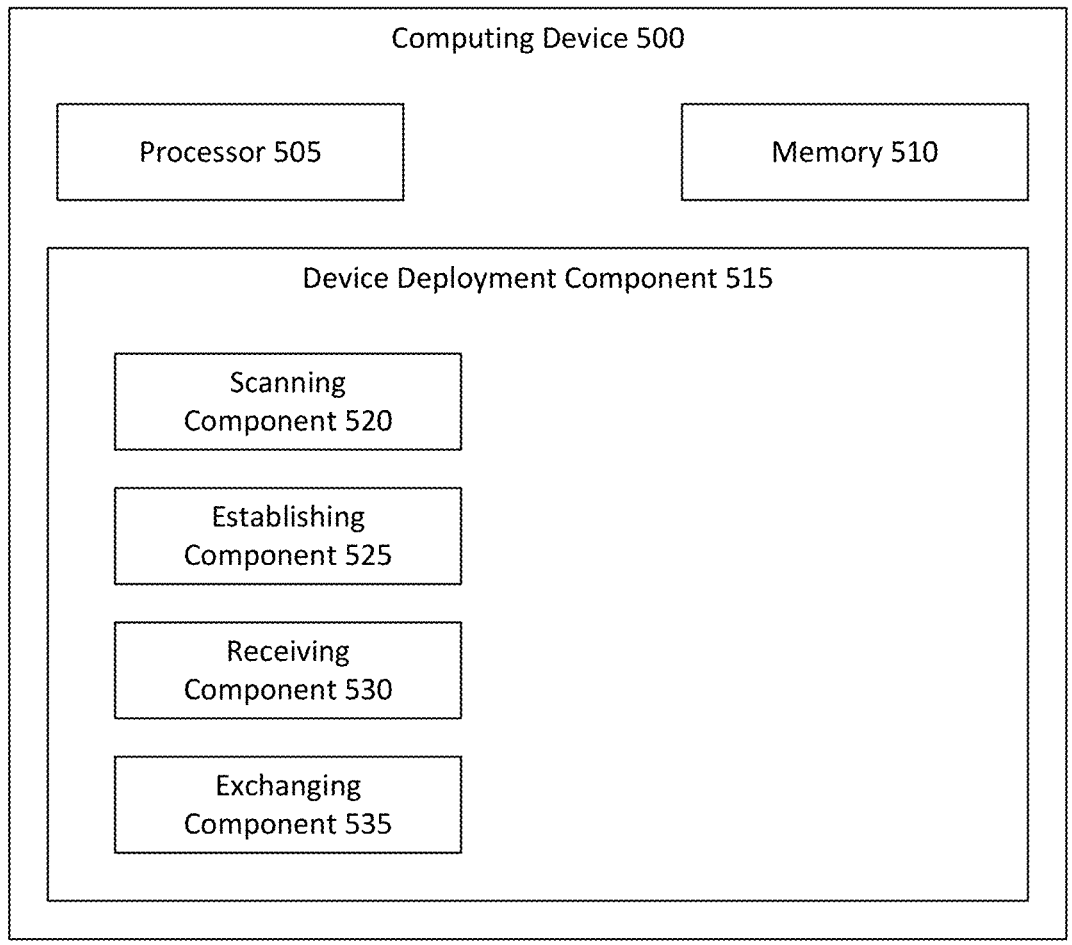
FIG. 5 is a block diagram of an example of a computer device having components configured to perform a method for configuring a device.
Figure 6:
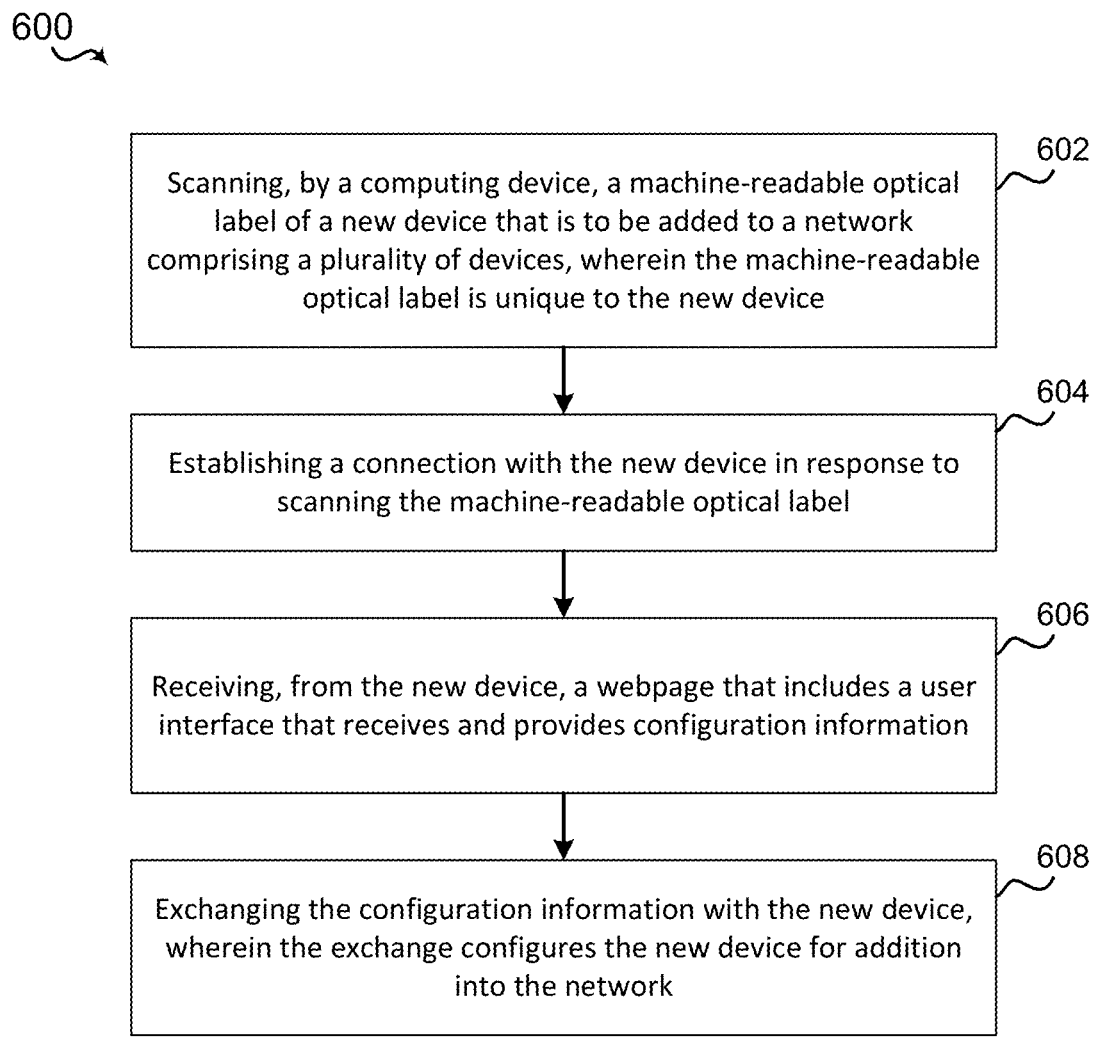
FIG. 6 is a flowchart of an example of a method of configuring a device.

Referring to FIG. 5 and FIG. 6, in operation, computing device 500 may perform a method 600 for configuring a device, by such as via execution of device deployment component 515 by processor 505 and/or memory 510.

At block 602, the method 600 includes scanning, by a computing device, a machine-readable optical label of a new device that is to be added to a network comprising a plurality of devices, wherein the machine-readable optical label is unique to the new device. For example, in an aspect, computing device 500, processor 505, memory 510, device deployment component 515, and/or scanning component 520 may be configured to or may comprise means for scanning, by computing device 102, a machine-readable optical label 106 of new device 104 that is to be added to network 108 comprising a plurality of devices 110, wherein machine-readable optical label 106 is unique to new device 104. For example, computing device 102 may have a camera that captures an image of optical label 106.

In an alternative or additional aspect, machine-readable optical label 106 does not point a webpage of an Internet-based server, but instead points to a webpage stored on new device 104. This means that the configuration/deployment process occurs completely on the edge layer.

At block 604, the method 600 includes establishing a connection with the new device in response to scanning the machine-readable optical label. For example, in an aspect, computing device 500, processor 505, memory 510, device deployment component 515, and/or establishing component 525 may be configured to or may comprise means for establishing a connection with new device 104 in response to scanning machine-readable optical label 106. For example, establishing component 525 may establish a local connection that enables computing device 102 to access a webpage from new device 104. This local connection is private and does not involve a third device. In some aspects, the local connection is one of: Internet-based, Bluetooth-based, near-field communication (NFC)-based.

At block 606, the method 600 includes receiving, from the new device, a webpage that includes a user interface that receives and provides configuration information. For example, in an aspect, computing device 500, processor 505, memory 510, device deployment component 515, and/or receiving component 530 may be configured to or may comprise means for receiving, from new device 104, webpage 112 that includes a user interface that receives and provides configuration information.

At block 608, the method 600 includes exchanging the configuration information with the new device, wherein the exchange configures the new device for addition into the network. For example, in an aspect, computing device 500, processor 505, memory 510, device deployment component 515, and/or exchanging component 535 may be configured to or may comprise means for exchanging the configuration information with new device 104, wherein the exchange configures new device 104 for addition into network 108.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus for generating deployment capabilities of a device, comprising:
    a memory; and
    a processor coupled with the memory and configured to:
        generate a machine-readable optical label that is specific to the device during manufacturing, wherein the device is a new device that is to be added to a network comprising a plurality of devices;
        configure a firmware of the device to create a web server that provides a webpage, wherein the webpage includes a user interface that receives and provides configuration information;
        configure the webpage to enter a dormant mode subsequent to a deployment completion of the device, wherein the webpage prevents configuration changes to the device in the dormant mode, wherein the webpage in the dormant mode generates an indication that the device requires a factory reset to reconfigure when a different device attempts to re-scan the machine-readable optical label after the deployment completion; and
        link the machine-readable optical label to the webpage such that when the machine-readable optical label is scanned by the different device, the webpage is generated on the different device.

2. The apparatus of claim 1, wherein the machine-readable optical label is based on a unique address identifier of the device.

3. The apparatus of claim 1, wherein the configuration information includes one or more of: a Static Internet Protocol (IP) address, a Dynamic Host Configuration Protocol (DHCP) IP address, a host parameter, a medium access control (MAC) address, user preference information, or a security parameter.

4. The apparatus of claim 1, wherein the processor is further configured to:

configure the webpage to enter an active mode subsequent to a factory reset of the device, wherein the webpage presents, in the active mode, the user interface that receives and provides the configuration information in response to the machine-readable optical label being scanned again.

5. A method for generating deployment capabilities of a device, comprising:
generating a machine-readable optical label that is specific to the device during manufacturing, wherein the device is a new device that is to be added to a network comprising a plurality of devices;
configuring a firmware of the device to create a web server that provides a webpage, wherein the webpage includes a user interface that receives and provides configuration information;
configuring the webpage to enter a dormant mode subsequent to a deployment completion of the device, wherein the webpage prevents configuration changes to the device in the dormant mode, wherein the webpage in the dormant mode generates an indication that the device requires a factory reset to reconfigure when a different device attempts to re-scan the machine-readable optical label after the deployment completion; and
linking the machine-readable optical label to the webpage such that when the machine-readable optical label is scanned by the different device, the webpage is generated on the different device.

6. The method of claim 5, wherein the machine-readable optical label is based on a unique address identifier of the device.

7. The method of claim 5, wherein the configuration information includes one or more of: a Static Internet Protocol (IP) address, a Dynamic Host Configuration Protocol (DHCP) IP address, a host parameter, a medium access control (MAC) address, user preference information, or a security parameter.

8. The method of claim 5, further comprising:
configuring the webpage to enter an active mode subsequent to a factory reset of the device, wherein the webpage presents, in the active mode, the user interface that receives and
provides the configuration information in response to the machine-readable optical label being scanned again.

9. An apparatus for configuring a device, comprising:
a memory; and
a processor coupled with the memory and configured to:
scan, by a computing device, a machine-readable optical label of a new device that is to be added to a network comprising a plurality of devices, wherein the machine-readable optical label is unique to the new device;
establish a connection with the new device in response to scan the machine-readable optical label;
receive, from the new device, a webpage that includes a user interface that receives and provides configuration information, wherein the webpage is configured to enter a dormant mode subsequent to a deployment completion of the new device, wherein the webpage prevents configuration changes to the new device in the dormant mode, wherein the webpage in the dormant mode generates an indication that the new device requires a factory reset to reconfigure when the computing device attempts to re-scan the machine-readable optical label after the deployment completion; and
exchange the configuration information with the new device, wherein the exchange configures the new device for addition into the network.

10. The apparatus of claim 9, wherein the machine-readable optical label does not point a webpage of an Internet-based server.

11. A method for configuring a device, comprising:
scanning, by a computing device, a machine-readable optical label of a new device that is to be added to a network comprising a plurality of devices, wherein the machine-readable optical label is unique to the new device;
establishing a connection with the new device in response to scanning the machine-readable optical label;
receiving, from the new device, a webpage that includes a user interface that receives and provides configuration information, wherein the webpage is configured to enter a dormant mode subsequent to a deployment completion of the new device, wherein the webpage prevents configuration changes to the new device in the dormant mode, wherein the webpage in the dormant mode generates an indication that the new device requires a factory reset to reconfigure when the computing device attempts to re-scan the machine-readable optical label after the deployment completion; and
exchanging the configuration information with the new device, wherein the exchange configures the new device for addition into the network.

12. The method of claim 11, wherein the machine-readable optical label does not point a webpage of an Internet-based server.

* * * * *